(12) United States Patent
Wathne et al.

(10) Patent No.: US 8,261,674 B2
(45) Date of Patent: Sep. 11, 2012

(54) APPARATUS FOR HANDLING MODULES AT SEA

(75) Inventors: Asbjorn Wathne, Stavanger (NO); Gabriel Grodem, Randaberg (NO)

(73) Assignee: Acergy Norway AS, Randaberg (NO)

( * ) Notice: Subject to any disclaimer, the term of this patent is extended or adjusted under 35 U.S.C. 154(b) by 880 days.

(21) Appl. No.: 12/096,031

(22) PCT Filed: Nov. 29, 2006

(86) PCT No.: PCT/IB2006/004029
§ 371 (c)(1),
(2), (4) Date: Sep. 29, 2008

(87) PCT Pub. No.: WO2007/069081
PCT Pub. Date: Jun. 21, 2007

(65) Prior Publication Data
US 2009/0199745 A1 Aug. 13, 2009

(30) Foreign Application Priority Data
Dec. 6, 2005 (GB) .................... 0524859.6

(51) Int. Cl.
*B65D 19/38* (2006.01)
(52) U.S. Cl. ..... 108/54.1; 414/782; 414/754; 414/139.8
(58) Field of Classification Search ............. 108/51.11, 108/54.1, 94, 139; 414/777, 782, 754, 679, 414/678, 681, 572, 222.01, 137.1, 139.8; 198/373, 375, 468.01
See application file for complete search history.

(56) References Cited

U.S. PATENT DOCUMENTS

| | | | | |
|---|---|---|---|---|
| 2,808,223 A * | 10/1957 | Troutman et al. | | 108/139 |
| 2,828,931 A * | 4/1958 | Harvey | | 108/54.1 |
| 3,215,090 A | 11/1965 | Gibbs, Sr. | | |
| 3,283,883 A * | 11/1966 | Cruzen, Jr. | | 198/375 |
| 5,231,934 A * | 8/1993 | Good | | 108/54.1 |
| 6,273,237 B1 * | 8/2001 | Bazydola et al. | | 198/375 |
| 6,634,484 B2 * | 10/2003 | Gattrell et al. | | 198/375 |
| 6,981,685 B1 * | 1/2006 | McHugh et al. | | 248/678 |
| 7,377,733 B2 * | 5/2008 | Wright et al. | | 410/49 |
| 7,865,985 B2 * | 1/2011 | Revenus | | 108/139 |
| 2007/0017420 A1 * | 1/2007 | Hadar | | 108/54.1 |

FOREIGN PATENT DOCUMENTS

| | | |
|---|---|---|
| FR | 1354667 | 3/1964 |
| GB | 2199791 | 7/1988 |
| JP | 57127645 A * | 8/1982 |
| SU | 1283172 A1 * | 1/1987 |
| WO | WO 03/066425 | 8/2003 |

* cited by examiner

Primary Examiner — Jose V Chen
(74) Attorney, Agent, or Firm — Levy & Grandinetti

(57) ABSTRACT

A skidding pallet (200) for use on the skid rails (110, 115) of a vessel is disclosed, the pallet comprising a supporting means such as a frame (230), a mounting means for the mounting of an object thereon, and at least one actuation means, such as a cylinder (240), attached to one of the supporting means or mounting means. In use, the supporting means interfaces with the skid rails and the actuation means are actuatable to cause the mounting means to rotate in relation to said supporting means and the skid rails.

21 Claims, 8 Drawing Sheets

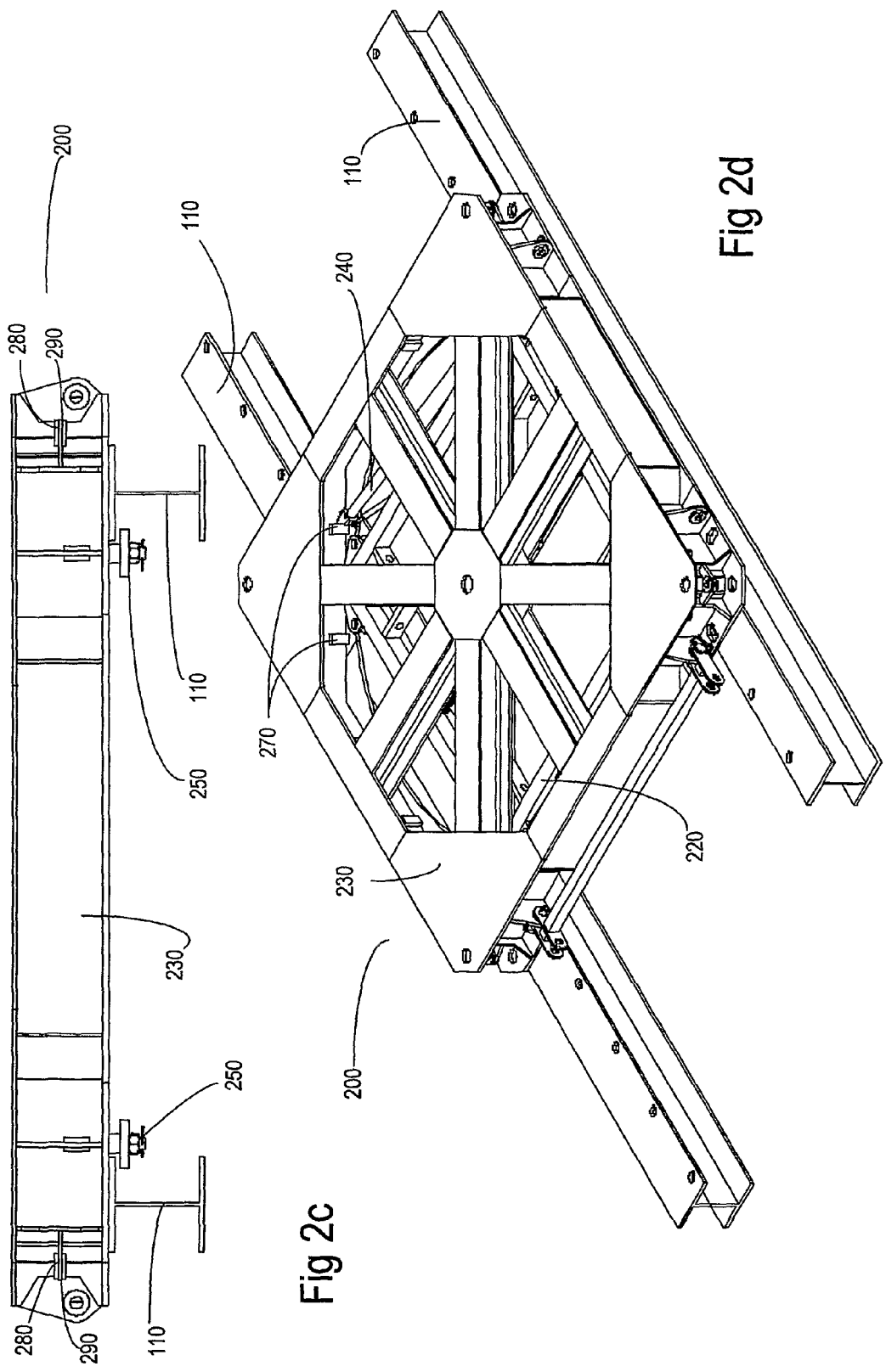

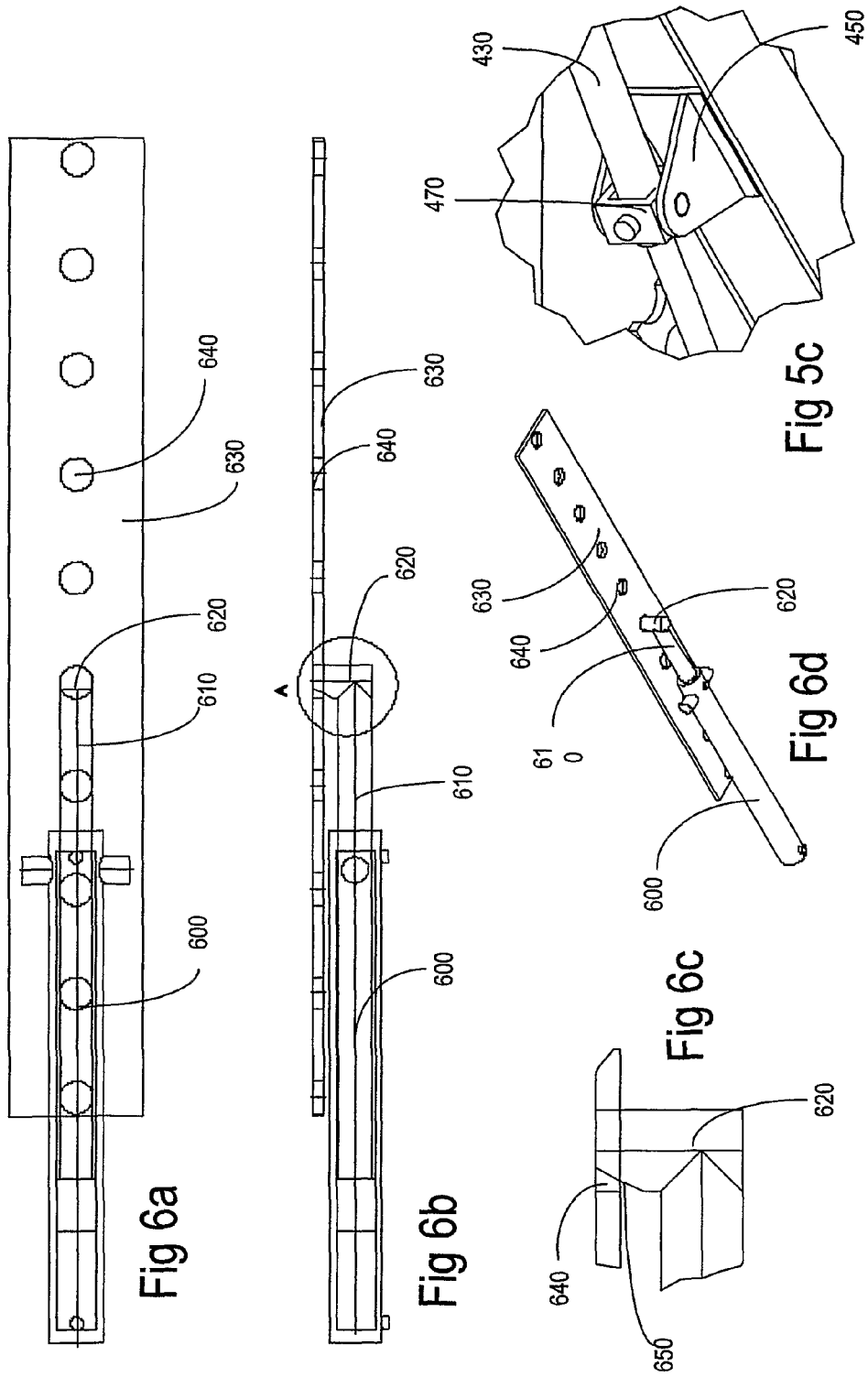

APPARATUS FOR HANDLING MODULES AT SEA

CROSS REFERENCE TO RELATED APPLICATION

This application claims the priority of GB 0524859.6 filed on 6 Dec. 2005, the disclosure of which is incorporated herein by reference for all purposes.

This invention relates to deployment or recovery of objects at sea (such as modules) and in particular to skidding pallets used during said deployment or recovery of objects.

Vessels, such as the Far Saga, which can be used for subsea installation and module handling operations, are commonly equipped with a moonpool and module handling system tower (MHS tower). These are used to recover/install subsea modules (chokes, control pods, subsea pumps, gas compressor or any other assembly which functions as a unit but can be joined with other units for increasing the function) from/to subsea templates. A subsea template is essentially a guide frame to aid alignment of the modules. The module or object to be deployed will commonly be positioned under the MHS tower (and above the moonpool) by a skidding pallet on skidding rails.

It is normal on module deployment operations for the module and its running tool to be loaded onboard the vessel when at quay, and seafastened to the skidding pallet on the skidding rails prior to departure to the installation site. The running tool is for carrying the module to the template and, in operation, runs on guidewires connecting the vessel to the template.

During deployment the vessel's bow should always be orientated against the weather. Furthermore, the orientation of the module is important as modules can only be installed in a set position and orientation on the template. Problems can arise when the orientation of the module (or the running tool), set during the mobilisation of the vessel, no longer coincides with the preferred vessel heading when on the installation site. This situation often leads to postponement of the operation until weather conditions are more suitable. The module and running tool should therefore be placed on the pallet with an orientation which coincides with the final installation position on the template, when the vessel lies with its bow against the weather.

When there is too large an offset between the module installation heading and the weather direction, the guidewires will start to twist, making it harder/impossible to run the running tool/module on the guidewires. Usually a 45 degree offset from the module installation heading can be dealt with if the water depth is sufficiently deep (approx 200 m plus). However the current and the size of the module (drag forces) will also have an impact on the ability to install with offset.

Therefore, the decision of what position/orientation the module shall have on the pallet needs to be based on the weather forecast. But direction of the weather often changes during the time between mobilisation and reaching the installation site. Also weather forecasting is never totally reliable.

It would therefore be desirable to have a way of changing the position of the running tool/module (or any other object) on the skidding pallet in a safe and simple manner while at sea. It would also be desirable that any solution does not require any significant changes to the vessel design or apparatus.

In a first aspect of the invention there is provided a pallet for use on the skid rails of a vessel, said pallet comprising a supporting means, a mounting means, for the mounting of an object thereon, and at least one actuation means attached to one of said frame members, wherein in use, said supporting means interfaces with the skid rails and said actuation means are actuatable to cause the mounting means to rotate in relation to said supporting means and said skid rails.

This ability to rotate the pallet with an object such as a running tool and module mounted thereon means that the vessel can take on the heading that is best for the circumstances and weather conditions while the pallet is simply repositioned to coincide with the subsea template as required.

At least part of the supporting means on either side may, in use, abut the inside edge of one of the skid rails such that its is moveable only in the direction of the skid rails. In one embodiment there is four abutments, one in the vicinity of each corner of the supporting means.

Said mounting means may be rotatably mounted on said guiding frame such that said mounting means is rotatable around its centre. Said mounting means may be connected to said supporting means by a pivot mounting located centrally to both frames.

Said pallet may have the same dimensions and interfaces as standard skidding pallets.

Said actuation means may comprise a hydraulic cylinder. Said hydraulic cylinder may be mounted at a first end to one of said supporting means or via mounting means at appoint on the cylinder body, with a second end of said hydraulic cylinder able to act against the other frame member such that when said ram is extended, one of said frame members rotates in relation to the other. Said hydraulic cylinder may be attached to said supporting means at a first end while said mounting means is provided with abutments evenly spaced around it, for the second end of said hydraulic cylinder to act against. Said abutments may comprise blocks or holes. Said blocks may each be provided with a recess. Said hydraulic cylinder may have a head for location in said holes or recesses. Said head may have an inclined edge, to prevent it locating in and/or abutting the edge of any abutments when being retracted.

The main pallet structure may be comprised in either the supporting means or the mounting means. If comprised in the mounting means, said supporting means may comprise a guiding frame having a width similar to the width between the inside edges of the two skid rails. In this case said mounting means may be arranged to sit on the skid rails, when in use. Extending from each corner of said guiding frame there may be wheel or roller means for running along a substantially circular track on an inside surface of said pallet structure, to allow the main pallet structure to rotate in relation to the guiding frame. The abutments for said hydraulic cylinder may also be located on an inside surface of said pallet structure. Said hydraulic cylinder may be pivotably mounted to said pallet structure and provided with a guiding means to guide its second end against said abutments. Said guiding means may be a secondary cylinder. In one embodiment, two main hydraulic cylinders are provided, each attached to opposite corners of said supporting means, each having a secondary cylinder.

If the main pallet structure is comprised in the supporting means, then said supporting means may be arranged to sit on the skid rails, when in use. The mounting means may then comprise a substantially flat panel. Said abutments may be located on the underside of said panel, arranged at regular intervals in a substantially circular configuration. Said hydraulic cylinder may be attached to said supporting means such that it allows movement in two axes, thus allowing the second end of said hydraulic cylinder to be held substantially on the circular path made by said abutments, and to engage/disengage with said abutments. This may be achieved by attaching the cylinder via a mounting. Said second end of said hydraulic cylinder may be arranged to raise up against the underside of the mounting means due to the action of gravity on the first end of said cylinder. The head of said hydraulic cylinder may have an inclined edge such that it does not engage with the abutments when being retracted.

BRIEF DESCRIPTION OF THE DRAWINGS

Embodiments of the invention will now be described, by way of example only, by reference to the accompanying drawings, in which:

FIG. 1b shows the Module Handling System Tower of the vessel of FIG. 1a;

FIGS. 2a to 2d show a pallet according to a first embodiment of the invention from above, in cross section, from one side, and in perspective view respectively;

FIGS. 5a-5c show, in cross section, perspective view and a detail, the pallet of FIGS. 4a and 4b being rotated; and FIGS. 6a to 6d show different views of an alternative form of actuating means for turning the pallet.

DETAILED DESCRIPTION OF THE EMBODIMENTS

Figure 1A:
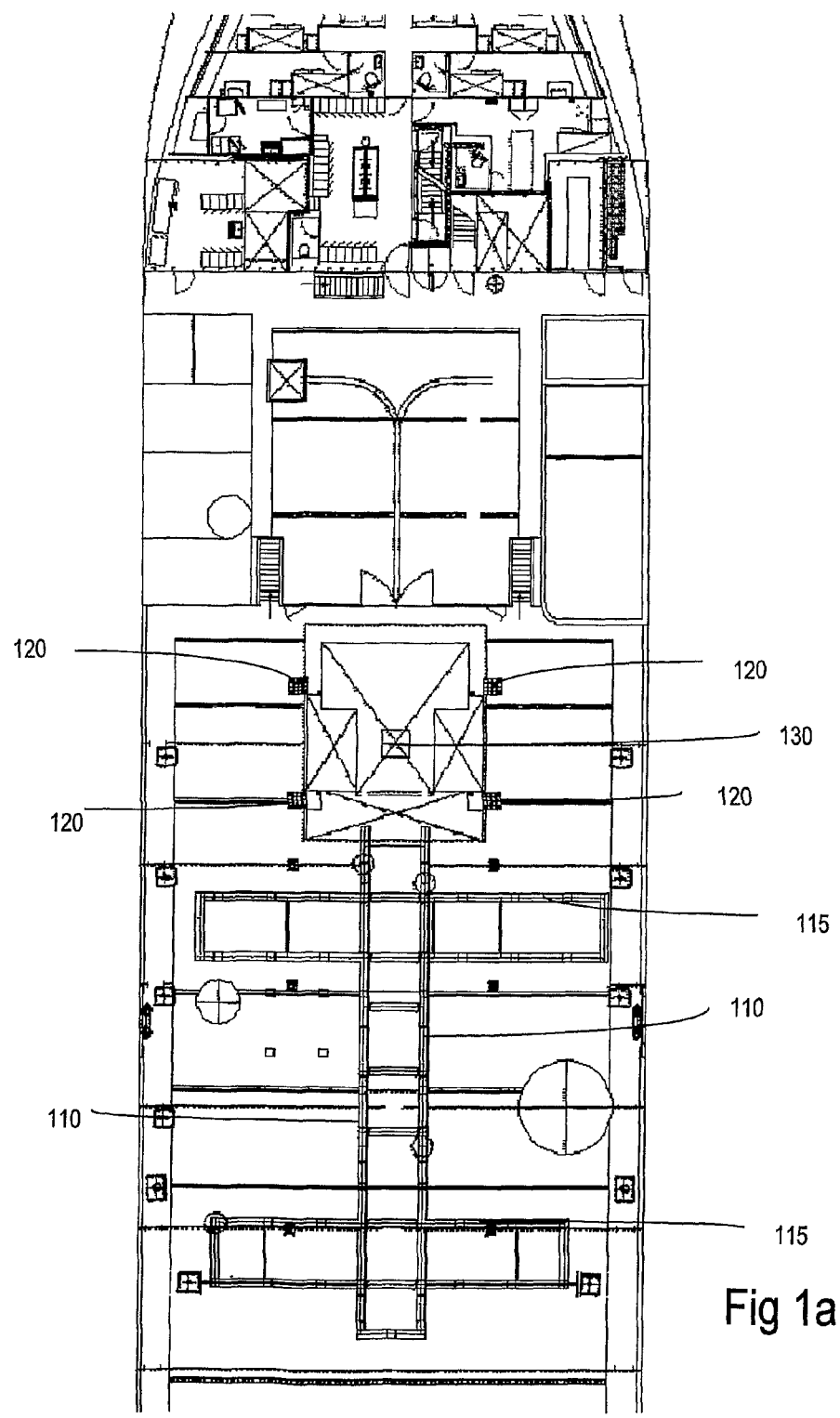
FIG. 1a shows a portion of the main deck of a vessel suitable for handling modules.
Figure 1B:
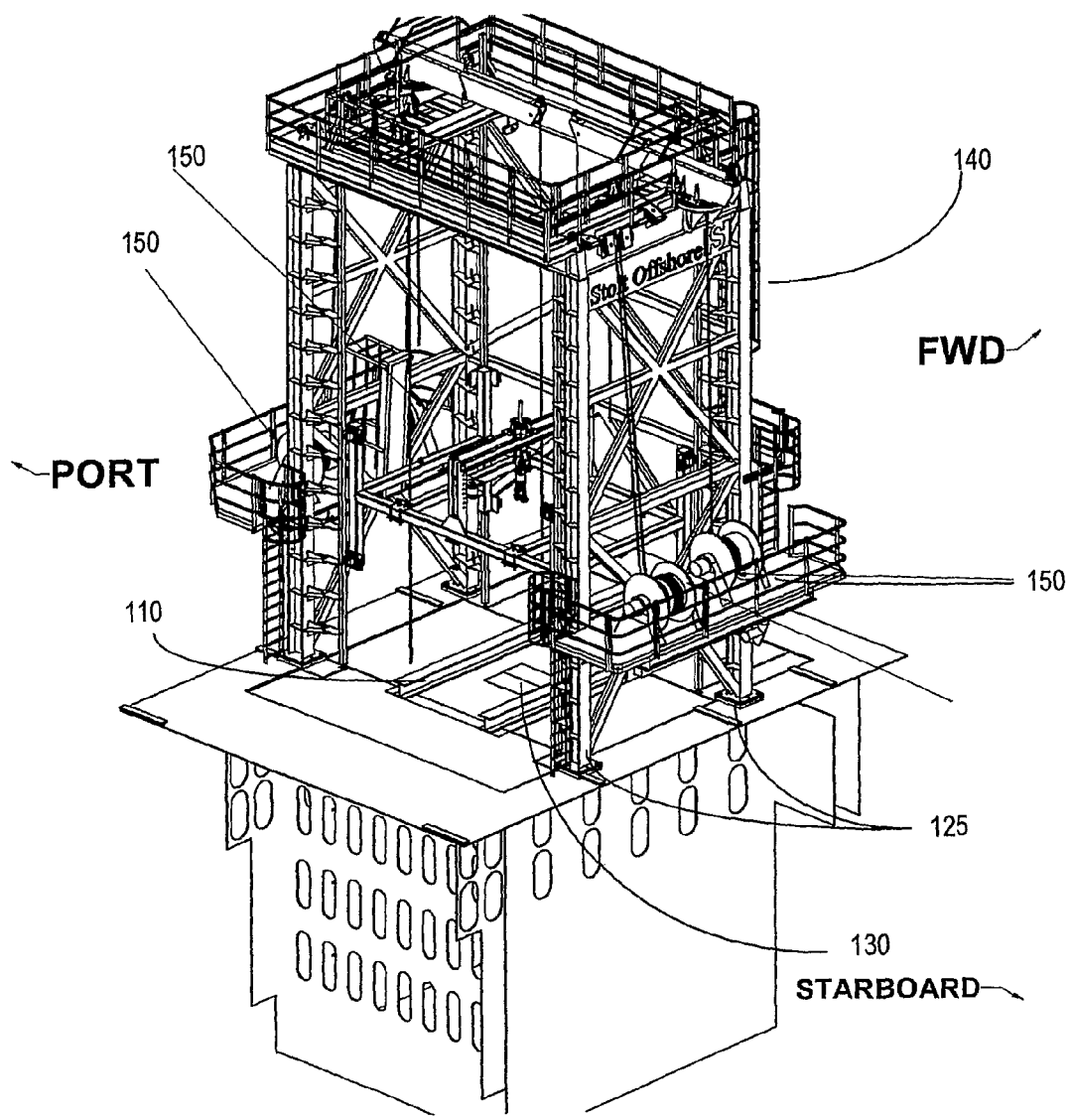
Figure 2A:
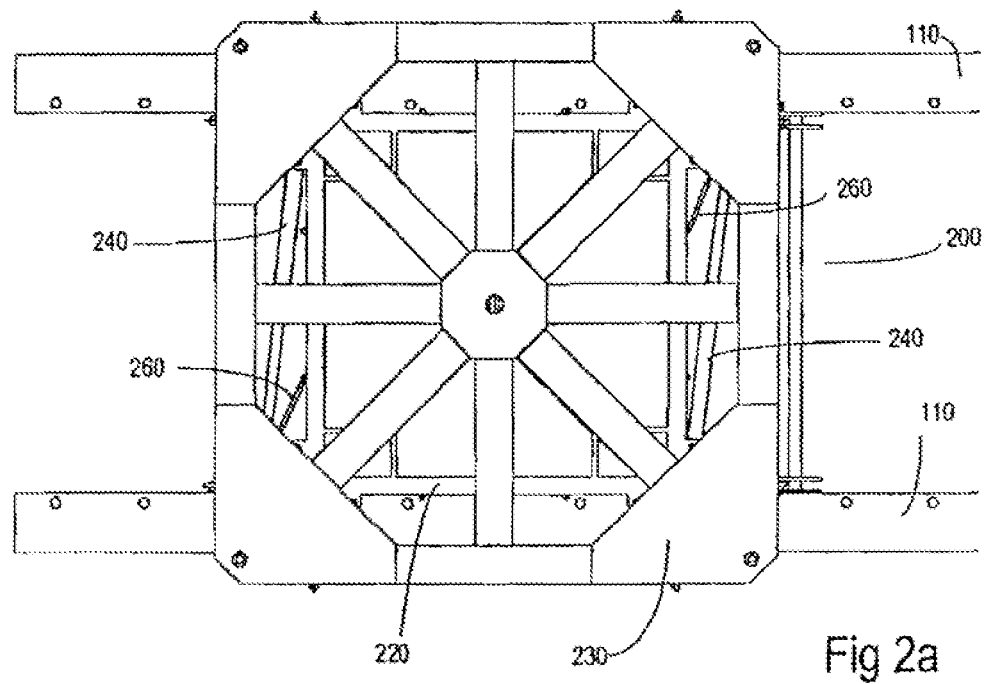
Figure 2B:
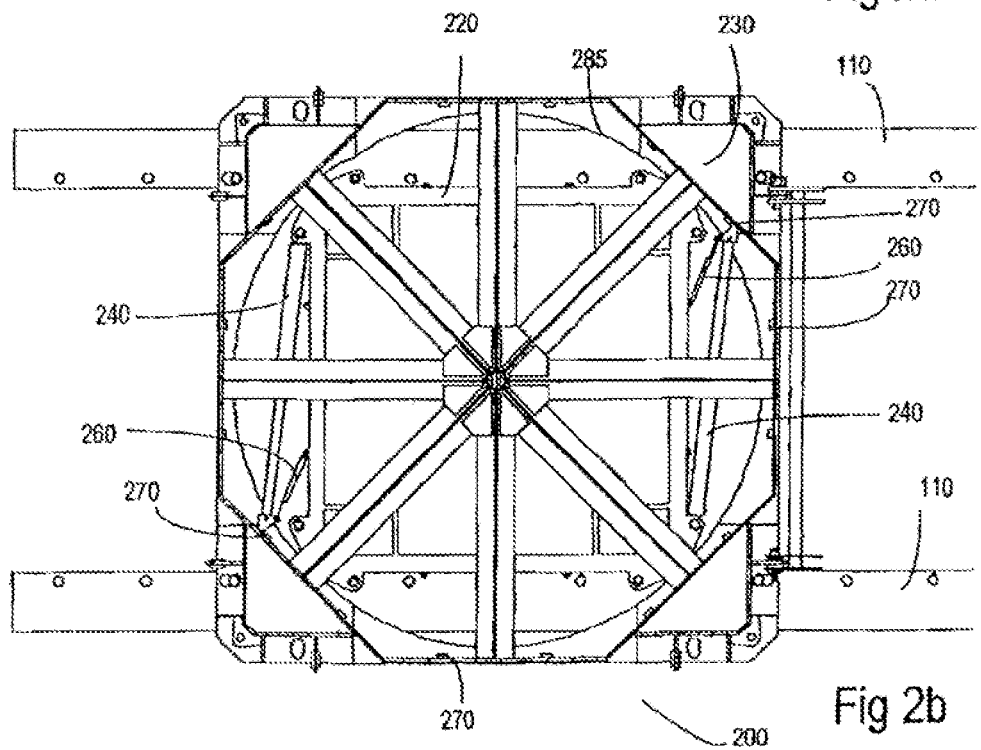

FIGS. 1a and 1b in conjunction show a general arrangement of a vessel equipped with a moonpool 130, module handling system tower (MHS tower) 140 and skid rails 110, 115. FIG. 1a shows a portion of the main deck from which can be clearly seen skid rails main track 110, leading to the moonpool 130 area under the tower. There are two other sets of skid rails, side tracks 115, perpendicular with these. FIG. 1b shows the MHS tower in detail. Its legs 125 are positioned at sites 120 (FIG. 1a) on the vessel deck. The tower is equipped with guide wire winches 150.

In normal operations, when the vessel is above the template, the pallet, with module/running tool, is skidded along the skid rails 110 into the MHS tower, over the moonpool. The MHS tower is then used to lift the module and allow the empty pallet to be skidded out the tower. The moonpool hatch can then be opened. The running tool with the module is then lowered on guidewires down to the template.

FIGS. 2a to 2d show the pallet 200 from above, in cross section, from one side, and in perspective view respectively. In each case the pallet 200 is shown on the skid rails 110. The pallet 200 consists of a guiding frame 220, a main pallet frame 230 and two main hydraulic cylinders 240, each with associated secondary guiding secondary cylinder 260. The guiding frame is provided with protrusions 250 (visible on FIG. 2c) in each corner. Spaced around the inside main frame 230 are a number of gripper blocks 270. Extending out from each corner of the guiding frame are wheels 280, and around the inside edge 285 is complementary track 290.

The guiding frame 220 is approximately as wide as the gap between the skid rails 110. The protrusions 250 are essentially a large bolt through each corner of the guiding frame 220 and a washer (and nut) underneath the rail flange. Due to the protrusions the guiding frame 220 can only move along the rails 110 and cannot change its orientation. The main pallet frame 230 sits on the skid rails 110 and can be skidded along them. It is attached to the guiding frame 220 by the location of wheels 280 into the tracks 290 such that they can be rotated relative to each other, the wheels 280 turning in the tracks 290. In effect this means that the main pallet frame 230 can be rotated relative to the guiding frame 220 and the rails 110, as the guiding frame cannot be turned due to the protrusions 250.

The overall pallet 200 has the same external dimensions and interfaces as standard skidding pallets. It is designed for a design load of 20Te and is moved on the skidding beams in the same way as the standard skidding pallets by the use of PPU's (Push-Pull Units).

There are two main hydraulic cylinders 240 for rotating the main pallet frame, each with one end (in this case the cylinder body end) pivotably attached to opposing corners of the guiding frame. The other end of each main hydraulic cylinder 240 (the rod) is forced to engage with one of the gripper blocks 270 due to the action of the guiding cylinders 260. The main hydraulic cylinders 240 can then be activated to push against the gripper blocks 270 causing the main pallet frame 230 to rotate.

Figure 3A:
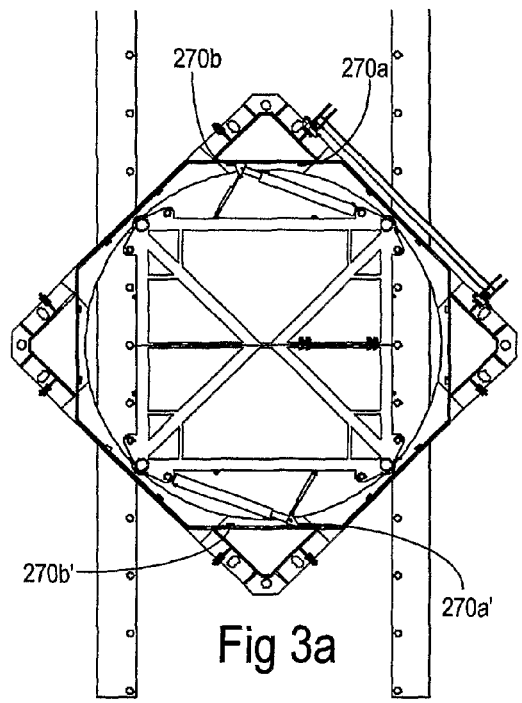
FIGS. 3a to 3d show, in cross section, the pallet of FIGS. 2a-2d in various stages of rotation.
Figure 3B:
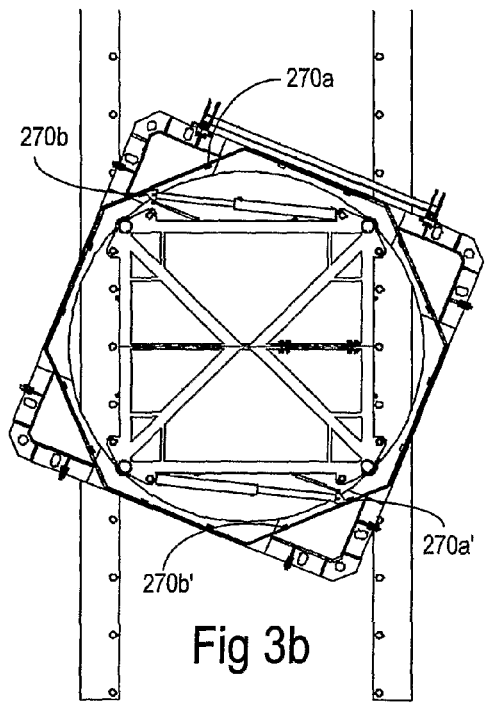
Figure 3C:
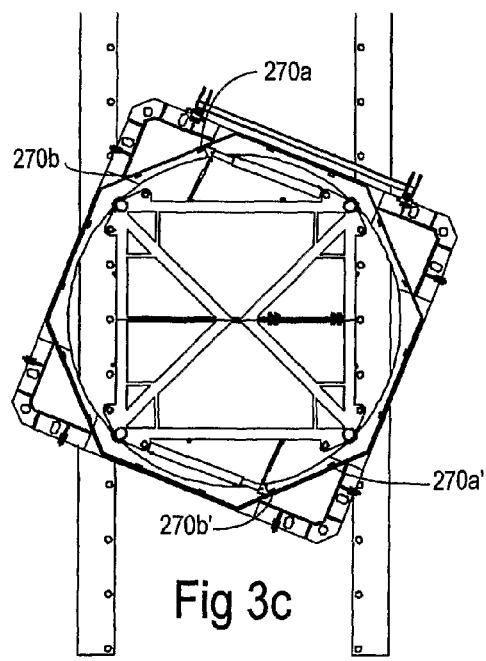
Figure 3D:
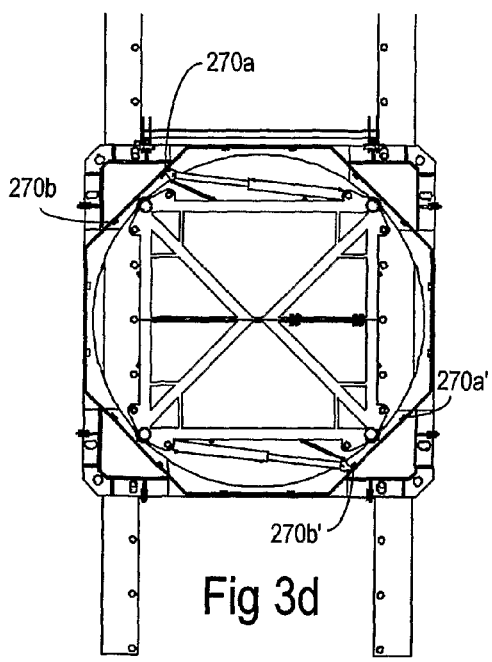

FIGS. 3a to 3d show cutaway drawings of the pallet 200 as it is being rotated. To operate the pallet 200, a hydraulic supply with a valve pack is connected to the pallet 200 through quick connectors. In FIG. 3a the main hydraulic cylinders 240 are each engaged against a gripper block 270a, 270a'. FIG. 3b shows the main hydraulic cylinders after they have been extended to their full stroke. The result of this is that the main pallet frame 230 is rotated relative to the fixed guiding frame 220. For each full-stroke cylinder 260 push, the pallet 200 is rotated approximately 22 degrees. Each main hydraulic cylinder 240 can then be controlled to retract and engage again with the next gripper block 270b, 270b' as shown in FIG. 3c and, should further rotation be required, be extended again, against these gripper blocks 270b, 270b'. FIG. 3d shows the pallet 200 after such a further extension. These steps can be repeated as many times as necessary. Eight pushes in total are needed for a full 180-degree rotation.

Figure 4A:
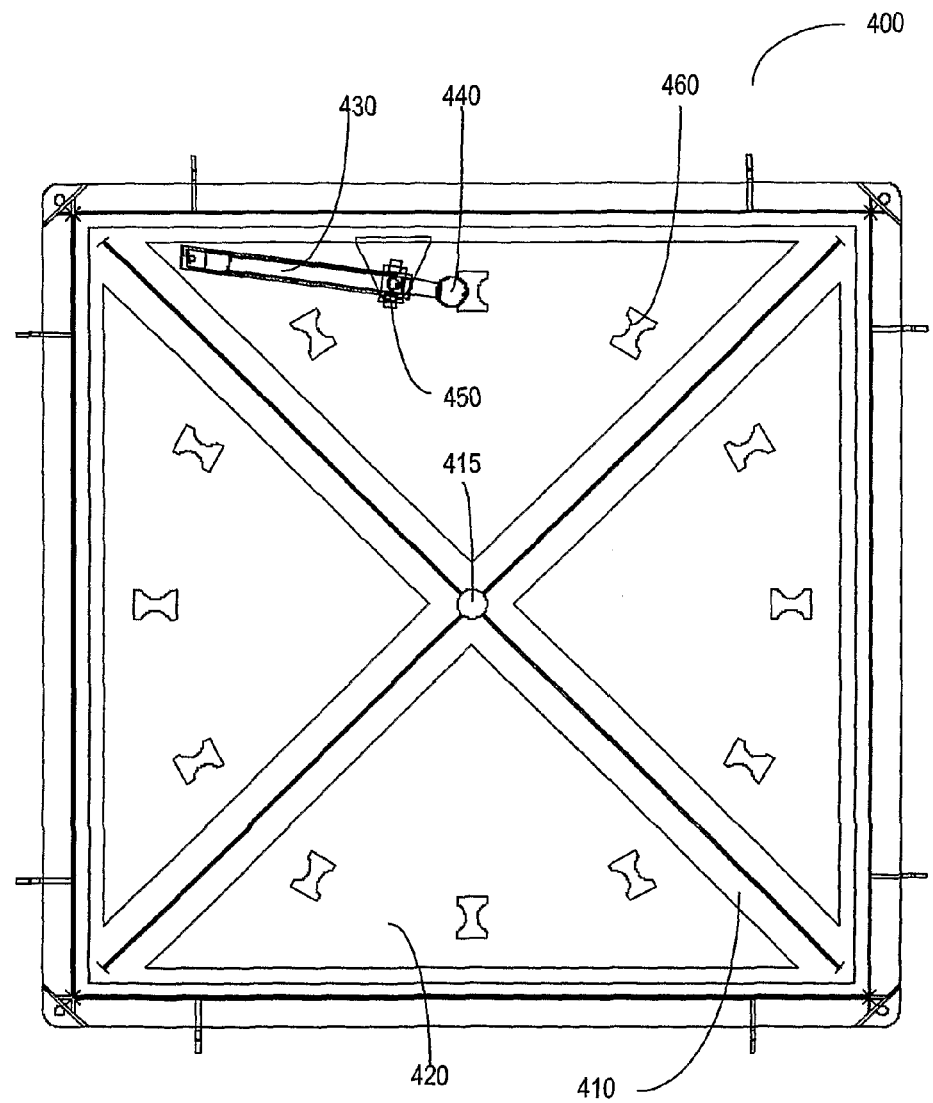
FIGS. 4a and 4b show a pallet according to a second embodiment of the invention from below and from one side.
Figure 4B:
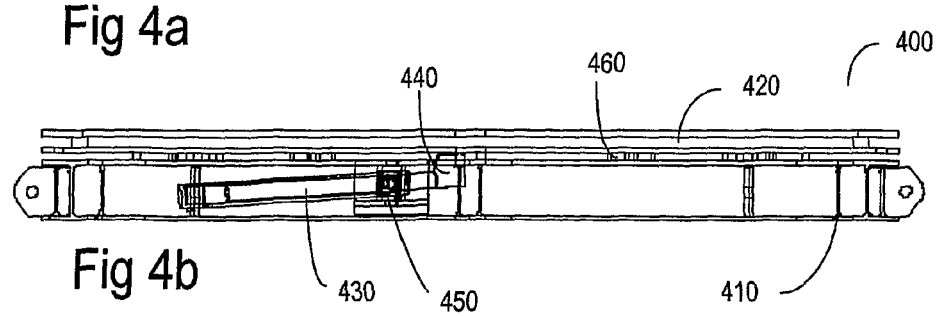

FIGS. 4a and 4b show a pallet (from below and one side respectively) 400 according to a further embodiment. It comprises pallet frame 410 and, rotatably mounted to this via central pivot 415, pallet top 420. A hydraulic cylinder 430 is attached to said pallet frame via mounting 450. At the end of the cylinder rod is a head 440, which abuts against recessed gripper blocks 460. In this embodiment the pallet frame makes up the support structure. It is this structure which sits on the rails, and has protrusions (not shown) similar to the protrusions 250 of FIG. 2c, to hold it to the rail in the same way as before. The pallet top 420 is essentially a flat panel with gripper blocks 460, arranged on its underside in a circular configuration as shown.

Figure 5A:
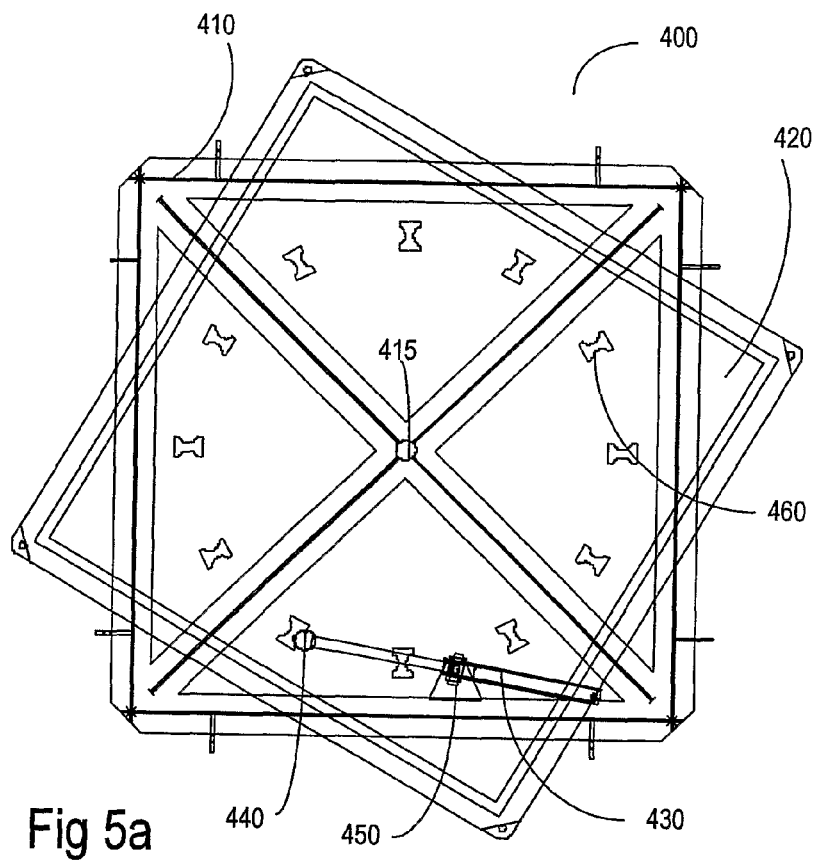
Figure 5B:
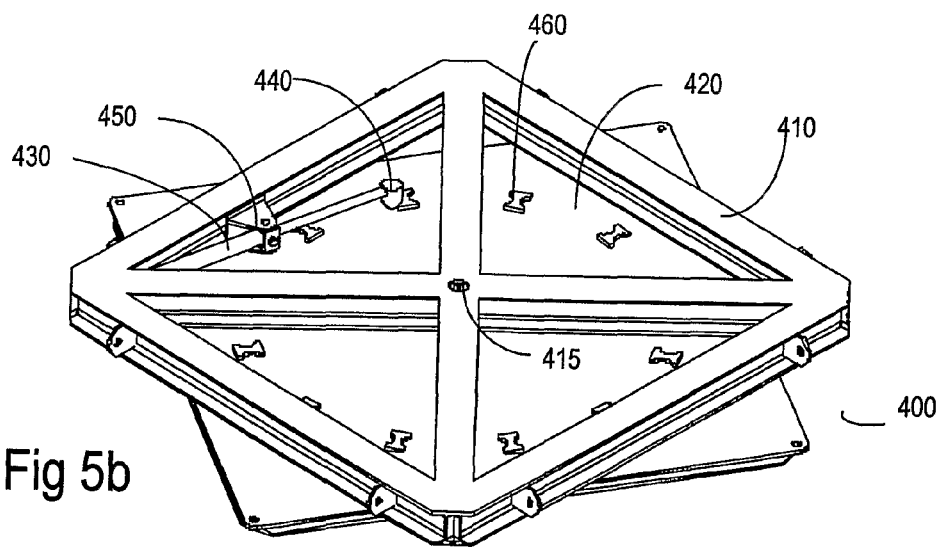

FIGS. 5a and 5b show the pallet (from below) after an extension of the hydraulic cylinder 430. The principle of how this pallet works is similar to the previous embodiment. The mounting 450 allows the cylinder to pivot in 2 directions, one allowing the head 440 of the cylinder rod to follow the circular pattern of gripping blocks. The other direction is for tilting the cylinder to allow it to engage the gripper blocks. The head 440 of the hydraulic cylinder acts against the gripper block 460, the gripper block having a recess to match the head 440 shape, under the influence of gravity as the cylinder housing is heavier than the piston/rod with head. This is because the mounting 450 is close to the rod end of the cylinder and when the cylinder 430 is retracted, there is little weight on the cylinder head 440 side of the mounting 450, and more weight on the other end. The cylinder will therefore tilt until the head is in contact with pallet top 420. Also, when the cylinder is extended, while more weight is transferred to the head side of the attachment and the cylinder head 440 also gets a longer moment around the attachment, the volume in the cylinder is filled by hydraulic oil, ensuring that the centre of gravity remains on the same side of the mounting 450.

This causes the pallet top to rotate around its axis approximately 30 degrees as shown. The cylinder 430 rod can then be retracted. The head has an inclined back edge such that it does not engage with the next gripper rod as it is retracted, but is deflected under it. When fully retracted, it can then be extended against this next gripper block as before. This process can be repeated as often as necessary.

FIG. 5c shows a close up of the cylinder mounting 450 for this embodiment. It shows the cylinder 430 being retained in a bracket 470, which is pivotably mounted inside said mounting 430. This allows the cylinder to be moveable around two axes as previously explained.

FIG. 6a to 6d show a number of views of an alternative actuation system for turning the pallet top 420. It comprises a hydraulic cylinder 600 with cylinder rod 610 and a head 620. This cylinder is largely similar to the hydraulic cylinder 430 of FIG. 4, and can be mounted to the pallet in the same way. Also provided a number of holes 640 in the underside of the pallet top for the head 620 to locate in. When located in a hole 640 the rod 610 can be extended as before, the head 620 abutting the edge of the hole, causing the pallet top 420 to rotate. These holes 640 may be bored straight into the pallet top 420 or into a strip 630, as shown here, the strip then attached to the pallet top 420 underside. Said holes should form a circular configuration as with the gripper blocks. The head 620 has an inclined edge 650, to prevent it locating in and/or abutting the edge of any holes 640 when being retracted, and is instead deflected out of the hole. A similar actuation system can also be envisaged for the pallet of FIG. 2, having holes along the inside edge of the main pallet frame 230.

The above example is for illustration only and further embodiments and variations can be envisaged without departing from the spirit and scope of the invention. For example there may be different means utilised to turn the main pallet frame, other than hydraulic cylinders. Any number of hydraulic cylinders may be used, as may any number of gripper blocks/holes.

The invention claimed is:

1. A pallet system for use in deploying objects on a vessel at sea, the pallet system comprising skid rails fixed to a vessel and a pallet mounted to skid on said skid rails, said pallet comprising a support, a mount rotatably mounted to said support, and at least one actuator attached to one of said support or mount and engaged with the other, wherein in use, said support has a support surface resting on the skid rails and activation of said actuator is operative to cause the mount to rotate in relation to said support and said skid rails.

2. A pallet system as claimed in claim 1 wherein at least part of the support on either side, in use, abuts an inside edge of one of the skid rails such that its is moveable only in the direction of the skid rails.

3. A pallet system as claimed in claim 2 wherein there are four blocks, one in the vicinity of each corner of the support.

4. A pallet system as claimed in claim 1 wherein said mount is rotatably mounted on said support such that said mount is rotatable around its centre.

5. A pallet system as claimed in claim 1 wherein said pallet has the same dimensions and interfaces as standard skidding pallets.

6. A pallet system as claimed in claim 5 wherein said mount is connected to said support by a pivot mounting located centrally to both said support and said mount.

7. A pallet system as claimed in claim 1 wherein said pallet comprises a main structural part for supporting a load on the skid rails, wherein said main structural part is comprised in the mount, and wherein said mount is arranged to sit on the skid rails, when in use.

8. A pallet system as claimed in claim 7 wherein said support comprises a guiding frame having a width similar to a width between inside edges of the two skid rails and adapted to guide movement of the pallet along the skid rails.

9. A pallet system as claimed in claim 8 further comprising at least one wheel or roller extending from each corner of said guiding frame for running along a substantially circular track on an inside surface of said main structural part, to allow the main structural part to rotate in relation to the guiding frame.

10. A pallet system as claimed in claim 7 wherein said actuator comprises a hydraulic cylinder having an extendable ram, said hydraulic cylinder is mounted at a first end to one of said main structural part or said guiding frame at a point on a body of the cylinder with a second end of a hydraulic cylinder able to act against the other of said main structural part or said guiding frame such that when said ram is extended, one of said main structural part or said guiding frame rotates in relation to the other.

11. A pallet system as claimed in claim 10 wherein said hydraulic cylinder is attached to said guiding frame at a first end while said main structure is provided with blocks evenly spaced around it, for the second end of said hydraulic cylinder to act against.

12. A pallet system as claimed in claim 11 wherein said blocks are each provided with a recess for location of the second end of said hydraulic cylinder.

13. A pallet system as claimed in claim 12 wherein said hydraulic cylinder further comprises a head for location in said recesses.

14. A pallet system as claimed in claim 13 wherein said head comprises an inclined edge, to prevent it locating in or abutting any of said blocks when the head is being retracted.

15. A pallet system as claimed in claim 11 wherein said blocks are located on an inside surface of said main structural part.

16. A pallet system as claimed in claim 15 wherein said hydraulic cylinder is pivotably mounted to said main structural part and provided with a guide to guide its second end against said blocks.

17. A pallet system as claimed in claim 16 wherein said guide is a secondary cylinder.

18. A pallet system as claimed in claim 17 wherein two main hydraulic cylinders are provided, each attached to opposite corners of said support, each having a secondary cylinder as a guide.

19. A pallet system as claimed in claim 1 wherein said pallet has a main structural part for supporting a load on the skid rails, wherein the main structural part is comprised in the support, and wherein said support is arranged to sit on the skid rails, when in use.

20. A pallet system as claimed in claim 19 wherein the mount comprises a substantially flat panel.

21. A pallet system as claimed in claim 19 wherein said actuator comprises a hydraulic cylinder having an extendable ram, said hydraulic cylinder is mounted at a first end to one of said main structural part or said panel at a point on a body of the cylinder, with a second end of said hydraulic cylinder able to act against the other of said main structural part or said panel such that when said ram is extended, one of said main structural part or said panel rotates in relation to the other.

* * * * *